United States Patent
Hughes et al.

(10) Patent No.: US 9,703,683 B2
(45) Date of Patent: Jul. 11, 2017

(54) SOFTWARE TESTING COVERAGE

(71) Applicant: International Business Machines Corporation, Armonk, NY (US)

(72) Inventors: Elizabeth M. Hughes, Currumbin Valley (AU); Gregory O. McCane, Gold Coast (AU); Alexander Starostin, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/950,458

(22) Filed: Nov. 24, 2015

(65) Prior Publication Data
US 2017/0147474 A1 May 25, 2017

(51) Int. Cl.
*G06F 11/36* (2006.01)
*G06F 3/048* (2013.01)

(52) U.S. Cl.
CPC ...... *G06F 11/3664* (2013.01); *G06F 11/3676* (2013.01); *G06F 11/3684* (2013.01); *G06F 3/048* (2013.01); *G06F 11/3688* (2013.01); *G06F 11/3692* (2013.01)

(58) Field of Classification Search
CPC ............ G06F 11/3664–11/3692; G06F 3/048–3/04812; G06F 3/04817–3/04855
See application file for complete search history.

(56) References Cited

U.S. PATENT DOCUMENTS

| | | | | |
|---|---|---|---|---|
| 7,055,137 B2* | 5/2006 | Mathews | ............ | G06F 11/3688 714/46 |
| 7,137,103 B2* | 11/2006 | Aizenbud-Reshef | | G06F 11/3676 714/E11.208 |
| 7,278,135 B2* | 10/2007 | Czerwonka | ......... | G06F 11/3684 714/E11.207 |
| 7,337,432 B2* | 2/2008 | Dathathraya | ....... | G06F 11/3684 714/E11.207 |
| 7,904,890 B1 | 3/2011 | Hsieh et al. | | |
| 8,132,056 B2 | 3/2012 | Thakkar et al. | | |

(Continued)

FOREIGN PATENT DOCUMENTS

WO 2014133493 A1 9/2014

OTHER PUBLICATIONS

Duran, J., et al., An Evaluation of Random Testing, IEEE Transactions on Software Engineering, vol. SE-10, No. 4, Jul. 1984, pp. 438-444, [retrieved on Jul. 25, 2016], Retrieved from the Internet: <URL:http://ieeexplore.ieee.org/>.*

(Continued)

*Primary Examiner* — Geoffrey St Leger
(74) *Attorney, Agent, or Firm* — Christopher McLane; Daniel R. Simek (57) ABSTRACT

In an approach for creating a test plan, a computer identifies one or more interactive inputs associated with a system under test. The computer identifies one or more tests associated with the one or more identified interactive inputs. The computer calculates a test inventory based on the identified one or more tests associated with the one or more identified interactive inputs. The computer creates a test plan that includes the identified one or more interactive inputs associated with the system under test, the identified one or more tests associated with the one or more identified interactive inputs, and the calculated test inventory.

17 Claims, 2 Drawing Sheets

(56) References Cited

U.S. PATENT DOCUMENTS

| | | | |
|---|---|---|---|
| 8,141,158 B2 | 3/2012 | Calendino et al. | |
| 8,201,150 B2 | 6/2012 | Ghiloni et al. | |
| 2003/0070119 A1* | 4/2003 | Dallin | G06F 11/3684 714/38.14 |
| 2003/0098879 A1* | 5/2003 | Mathews | G06F 11/3688 715/762 |
| 2004/0255275 A1* | 12/2004 | Czerwonka | G06F 11/3684 717/124 |
| 2006/0075302 A1* | 4/2006 | Ulrich | G06F 11/3688 714/38.14 |
| 2006/0117055 A1* | 6/2006 | Doyle | G06F 9/4443 |
| 2008/0010542 A1* | 1/2008 | Yamamoto | G06F 11/3672 714/38.1 |
| 2009/0199045 A1* | 8/2009 | Kasubuchi | G06F 11/3684 714/38.1 |
| 2009/0300585 A1* | 12/2009 | Meenakshisundaram | G06F 11/3664 717/124 |
| 2010/0146420 A1* | 6/2010 | Bharadwaj | G06F 3/0481 715/764 |
| 2012/0167059 A1 | 6/2012 | Kosuda | |
| 2012/0259576 A1* | 10/2012 | Thulasidasan | G06F 11/3684 702/123 |
| 2013/0074039 A1 | 3/2013 | Bnayahu et al. | |
| 2013/0159890 A1* | 6/2013 | Rossi | G06F 11/3608 715/762 |
| 2013/0174126 A1* | 7/2013 | Belihomji | G06F 11/3688 717/127 |
| 2014/0143758 A1* | 5/2014 | Peisachov | G06F 11/3676 717/124 |
| 2015/0339019 A1* | 11/2015 | Ledenev | G06F 11/3676 715/772 |
| 2015/0339213 A1* | 11/2015 | Lee | G06F 11/3664 717/125 |

OTHER PUBLICATIONS

He, Z-W, et al., GUI Test Case Prioritization by State-coverage Criterion, 2015 IEEE/ACM 10th International Workshop on Automation of Software Test (AST), May 23-24, 2015, pp. 18-22, [retrieved on Jan. 12, 2017], Retrieved from the Internet: <URL:http://ieeexplore.ieee.org/>.*

Gross, F., et al., EXSYST: Search-Based GUI Testing, 2012 34th International Conference on Software Engineering (ICSE), Jun. 2-9, 2012, pp. 1423-1426, [retrieved on Jan. 12, 2017], Retrieved from the Internet: <URL:http://ieeexplore.ieee.org/>.*

Memon et al., "Coverage Criteria for GUI Testing", Proceeding ESEC/FSE-9 Proceedings of the 8th European software engineering conference held jointly with 9th ACM SIGSOFT international symposium on Foundations of software engineering, pp. 256-267, Printed Aug. 14, 2015.

Staats et al., Coverage Metrics for Requirements-Based Testing: Evaluation of Effectiveness, Proceedings of NFM 2010, Apr. 13-15, 2010, Washington D.C., 10 pages.

* cited by examiner

SOFTWARE TESTING COVERAGE

BACKGROUND

The present invention relates generally to the field of software development, and more particularly to software testing.

Software testing is an investigation conducted to provide information pertaining to the quality of the product or service under test. Software testing evaluates a program or application with the intent of finding errors or other defects (e.g., software bugs) by evaluating one or more properties for which the software is written to achieve. A test suite (e.g., collection of test cases and/or test scenarios) is developed for the purpose of validating a software program by demonstrating the software program meets a specified set of behaviors. Historically, the degree to which the software program is exercised by the test suite is measured as a percentage, based on one or more coverage criteria (e.g., function coverage, statement coverage, branch coverage, condition coverage, etc.). A program with high coverage is considered to be more thoroughly tested and have a lower chance of containing software bugs than a program with low coverage.

When designing test cases for software testing, multiple approaches are available, although primarily software testing methods include either white box testing or black box testing. In white box testing, the internal structure, design, and implementation of the software to be tested is known to a tester. For white box testing, the tester has access to the source code and chooses inputs to exercise code paths and determines the appropriate outputs. In black box testing, the software is a "black box" in which the internal structure, design, and implementation of the software is not known by the tester. For black box testing, the tester is only aware of external inputs and what an expected outcome should be but is not aware of how the program arrives at the expected outcome.

White box and black box testing include dynamic testing. Static testing is the implicit analysis of computer software that is performed without actually executing the program. Static testing involves individuals proofreading the source code (e.g., reviews, walkthroughs, inspections, etc.), utilizing programming tools/text editors to check the source code structure and/or, utilizing compilers (pre-compilers) to check syntax and data flow. Dynamic testing takes place when the program is actually running, thus allowing an examination of the physical response from the system to variables that are not constant and change with time. Dynamic testing involves manual and/or automated processes through unit tests, integration tests, system tests, and acceptance testing, etc., that execute specific test cases by providing input values and checking the output for anticipated results in order to determine success and/or failure.

SUMMARY

Aspects of the present invention disclose a method, computer program product, and system for creating a test plan. The method includes one or more computer processors identifying one or more interactive inputs associated with a system under test. The method further includes one or more computer processors identifying one or more tests associated with the one or more identified interactive inputs. The method further includes one or more computer processors calculating a test inventory based on the identified one or more tests associated with the one or more identified interactive inputs. The method further includes one or more computer processors creating a test plan that includes the identified one or more interactive inputs associated with the system under test, the identified one or more tests associated with the one or more identified interactive inputs, and the calculated test inventory.

DETAILED DESCRIPTION

Software testing is a critical step in validating the quality of a software program. Embodiments of the present invention recognize that the number of possible tests available to validate the quality of a software program are practically infinite, and even if each statement within the software program is tested, the entire system is not necessarily completely tested. For example, while a finite number of statement tests and branch tests exist within individual software programs, the number of tests that exist for the system all together (e.g., integration of multiple software programs) is, for practical purposes, an unbounded set. Embodiments of the present invention also recognize that software testing incorporates a manual strategy to select tests that are feasible, based on the available time and resources, in order to cover an acceptable percentage of the possible tests but are subjective, error prone, and time consuming. Embodiments of the present invention determine a repeatable total number of feasible tests associated with the software program and generate a test plan report to assist in the creation of a test suite. Additionally, embodiments of the present invention calculate a test coverage percentage based on executing subsequent test suites with respect to the total number of feasible tests.

Figure 1:
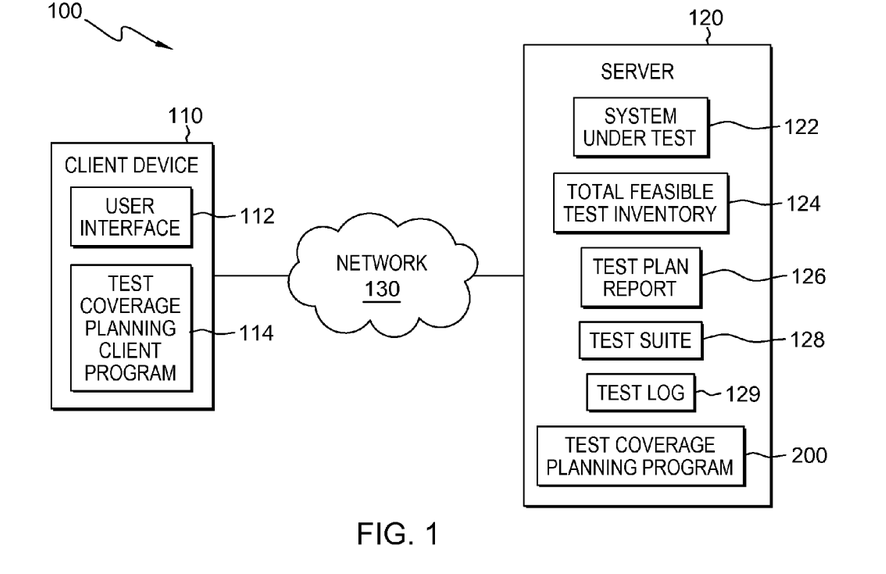
FIG. 1 is a functional block diagram illustrating a software testing environment, in accordance with an embodiment of the present invention.

The present invention will now be described in detail with reference to the Figures. FIG. 1 is a functional block diagram illustrating a software testing environment, generally designated 100, in accordance with one embodiment of the present invention. FIG. 1 provides only an illustration of one embodiment and does not imply any limitations with regard to the environments in which different embodiments may be implemented.

In the depicted embodiment, software testing environment 100 includes client device 110 and server 120 interconnected over network 130. Software testing environment 100 may include additional computing devices, mobile computing devices, servers, computers, storage devices, or other devices not shown.

Client device 110 may be an electronic device or computing system capable of processing program instructions and receiving and sending data. In some embodiments, client device 110 may be a laptop computer, a tablet computer, a netbook computer, a personal computer (PC), a desktop computer, a personal digital assistant (PDA), a smart phone, or any programmable electronic device capable of communicating with network 130. In other embodiments, client device 110 may represent a server computing system utilizing multiple computers as a server system, such as in a cloud computing environment. In general, client device 110 is representative of any electronic device or combination of electronic devices capable of executing machine readable program instructions as described in greater detail with regard to FIG. 3, in accordance with embodiments of the present invention. Client device 110 contains user interface 112 and test coverage planning client program 114.

User interface 112 is a program that provides an interface between a user of client device 110 and a plurality of applications that reside on client device 110 (e.g., test coverage planning client program 114) and/or may be accessed over network 130. A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information through test coverage planning client program 114 to test coverage planning program 200.

Test coverage planning client program 114 is a set of one of more programs designed to carry out the operations for a specific application to assist a user to perform an activity (e.g., selecting system under test 122, entering inputs, receiving feedback, etc.). In the depicted embodiment, test coverage planning client program 114 resides on client device 110. In another embodiment, test coverage planning client program 114 may reside on server 120 or on another device (not shown) connected over network 130. Test coverage planning client program 114 sends and receives information to and from test coverage planning program 200.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110 over network 130. In other embodiments, server 120 may represent a server computing system utilizing multiple computers as a server system, such as in a cloud computing environment. Server 120 contains system under test 122, total feasible test inventory 124, test plan report 126, test suite 128, test log 129, and test coverage planning program 200.

System under test 122 refers to a software system that is being tested for correct operation. A software system is a set of interacting, interdependent, and/or intercommunicating components (e.g., software package, a web service, a web resource, a module, etc.) that encapsulates a set of related functions based on a set of machine-readable instructions that directs the processor of a computer to perform specific operations forming part of a computer system (i.e., a combination of hardware and software) resulting in a complex intricate whole system. In an example embodiment, system under test 122 is a "black box" software system in which the internal structure, design, and implementation of the software is not known by the tester. In the depicted embodiment, system under test 122 resides on server 120. In another embodiment, system under test 122 resides on client device 110. In some other embodiment, system under test 122 resides on another server, client device, or another device (not shown) provided system under test 122 is accessible by test coverage planning program 200.

Total feasible test inventory 124 refers to the overall potential number of user input tests associated with system under test 122 (e.g., summation of all potential tests and associated supplied data). For example, a single test is a combination of the user input field and supplied data wherein the supplied data includes four possible inputs, therefore total feasible test inventory 124 equals a total of four. In the depicted embodiment, total feasible test inventory 124 resides on server 120. In another embodiment, total feasible test inventory 124 resides on client device 110. In some other embodiment, total feasible test inventory 124 resides on another server, client device, or another device (not shown) provided total feasible test inventory 124 is accessible by test coverage planning program 200.

Test plan report 126 is a document detailing the results of total feasible test inventory 124 (i.e., description of each required test and an overall number of tests identified). A test plan documents the strategy to use to verify and ensure that a product and/or system meets design specifications and other requirements. Test plan report 126 includes a user input field screen uniform resource locator (URL), user input field nodes (e.g., addressing syntax), type of input field (e.g., character, numeric, integer, etc.), and necessary tests for the associated field. For example, test plan report 126 identifies the user input field to be a credit card, the type of input field to be numeric, a valid entry test, boundary value test, below the lower-bound test, and above the upper-bound test. In the depicted embodiment, test plan report 126 resides on server 120. In another embodiment, test plan report 126 resides on client device 110. In some other embodiment, test plan report 126 resides on another server, client device, or another device (not shown) provided test plan report 126 is accessible by test coverage planning program 200.

Test suite 128 is a collection of test cases that are intended to be used to test system under test 122 in order to show system under test 122 meets a specified set of behaviors based off of the information within test plan report 126. A test suite includes detailed instructions or goals for the test cases and information on the system configuration to be used during testing. Test cases identify a set of conditions under which a test determines whether system under test 122 (e.g., an application, software system, etc.) works as originally established. When run, test suite 128 creates test log 129 (e.g., records test results). In the depicted embodiment, test suite 128 resides on server 120. In another embodiment, test suite 128 resides on client device 110. In some other embodiment, test suite 128 resides on another server, client device, or another device (not shown) provided test suite 128 is accessible by test coverage planning client program 114 and test coverage planning program 200.

Test log 129 records the results of test suite 128 (e.g., passing and/or failing results of the test cases within test suite 128) for system under test 122. A log file, such as test log 129, is a file that records either events that occur in an operating system or other software runs (e.g., record of activity) that can be used to understand the activity of a system and diagnose problems (e.g., software bugs). In the depicted embodiment, test log 129 resides on server 120. In another embodiment, test log 129 resides on client device 110. In some other embodiment, test log 129 resides on another server, client device, or another device (not shown) provided test log 129 is accessible by test coverage planning program 200.

Network 130 may be a local area network (LAN), a wide area network (WAN) such as the Internet, a wireless local area network (WLAN), any combination thereof, or any combination of connections and protocols that will support communications between client device 110, server 120, and other computing devices and servers (not shown), in accordance with embodiments of the inventions. Network 130 may include wired, wireless, or fiber optic connections.

Test coverage planning program 200 is a program for determining total feasible test inventory 124 (e.g., total number of tests), and generating test plan report 126 (e.g., description of each required test and an overall number of tests) for use in the creation of test suite 128. Additionally, test coverage planning program 200 determines a system test coverage percentage and/or a passing system test coverage percentage based on test log 129 with respect to total feasible test inventory 124 (e.g., total number of test performed/total number of tests, total number of passing test/total number of tests). Test coverage planning program 200 analyzes an actual running instance of system under test 122 to determine total feasible test inventory 124 rather than analyzing the source code, requirements and/or software design specifications. Test coverage planning program 200 sends and receives information to and from test coverage planning client program 114 regarding system under test 122. In the depicted embodiment, test coverage planning program 200 resides on server 120. In another embodiment, test coverage planning program 200 resides on client device 110. In some other embodiment, test coverage planning program 200 resides on another server, client device, or another device (not shown) provided test coverage planning program 200 is accessible by test coverage planning client program 114, and is able to access system under test 122, total feasible test inventory 124, test plan report 126, test suite 128, and test log 129.

Figure 2:
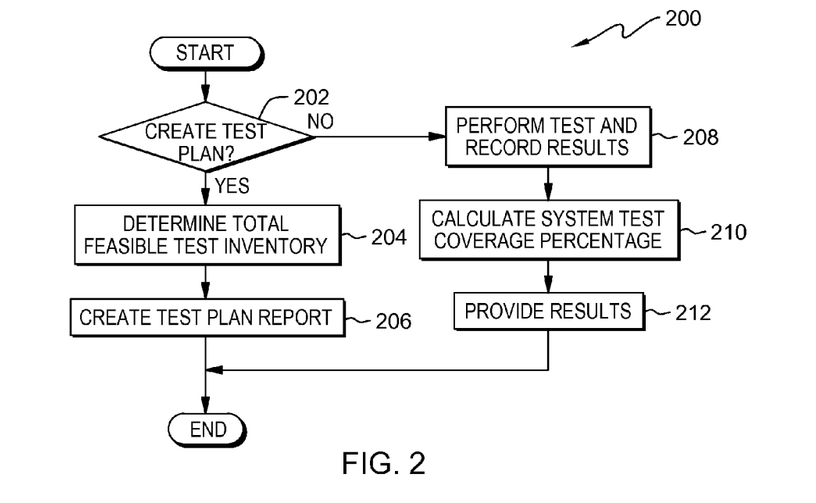
FIG. 2 is a flowchart depicting operational steps of a test coverage planning program, on a server computer within the software testing environment of FIG. 1, for identifying and determining the system test coverage of a test suite with respect to a system under test, in accordance with an embodiment of the present invention.

FIG. 2 is a flowchart depicting operational steps of test coverage planning program 200, a program for identifying and determining the system test coverage of test suite 128 with respect to system under test 122 (e.g., black box system), in accordance with an embodiment of the present invention. Prior to initiating, at least system under test 122 is written and available for analysis by test coverage planning program 200. Test coverage planning client program 114 and test coverage planning program 200 initiate in response to a user selection through user interface 112.

In decision 202, test coverage planning program 200 determines whether to create test plan report 126. Test coverage planning program 200 receives a selection through test coverage planning client program 114 from a user interacting with user interface 112. The selection includes system under test 122 and a task to perform. In one embodiment, test coverage planning program 200 receives a selection of a task with system under test 122 to create test plan report 126. For example, system under test 122 is a new software application in which the tester is unaware of the internal structure, design, and implementation (i.e., black box system). Additionally, test plan report 126 and test suite 128 do not exist; therefore, the user selects the option that initiates test coverage planning program 200 to create test plan report 126. In another example, system under test 122 includes changes (e.g., additions, deletions, corrections, etc.) to the source code. While test plan report 126 and test suite 128 may already exist, the changes to system under test 122 may impact the amount of software testing thus resulting in adding, changing, and/or deleting test cases within test suite 128 that are not known until test coverage planning program 200 recreates test plan report 126. In another embodiment, test coverage planning program 200 receives a selection of a task with system under test 122 to perform test suite 128. For example, test coverage planning program 200 created test plan report 126 previously for system under test 122 and test suite 128 exists, but actual testing has not occurred.

If test coverage planning program 200 determines the selection initiates creation of test plan report 126 (decision 202, yes branch) then test coverage planning program 200 scans system under test 122 (step 204). If test coverage planning program 200 determines the selection does not initiate the creation of test plan report 126 (decision 202, no branch), then test coverage planning program 200 performs test suite 128 and records results in test log 129 (step 208).

In step 204, test coverage planning program 200 determines total feasible test inventory 124. Test coverage planning program 200 runs system under test 122 (e.g., runs an executable, opens a web application, etc.). Test coverage planning program 200 scans (e.g., crawls through) the running instance of system under test 122 and identifies interactive user input fields (e.g., fields that require a response and/or selection from a user). During the scan, test coverage planning program 200 records the number and type of interactive user input fields. Interactive user input fields include: numeric input fields, textual input fields, drop-down boxes, radio button lists, checkboxes, list builders, date selections, sliders, drag and drop, etc. Test coverage planning program 200 executes the interactive user input fields associated with system under test 122. Test coverage planning program 200 determines the type of interactive user input field (e.g., numeric, text, drop-down, etc.). Based on the type of interactive user input field, test coverage planning program 200 determines input criteria to test the interactive user input field.

Test coverage planning program 200 determines total feasible test inventory 124 based on the actual interactive inputs from a running instance of system under test 122 rather than analyzing the source code and/or requirement documents and specifications. For example, the source code of system under test suite 128 may include interactive input fields that are not active (e.g., commented out, do not specify inputs, not included in the viewable when executed, etc.). When analyzing the design specifications and requirements documents a possibility exists to identify interactive input fields that are not currently included in system under test suite 128. In both instances, the analysis of the source code and/or design specifications and requirements may result in an inaccurate representation of system under test 122 and artificially increase total feasible test inventory 124.

In one embodiment, test coverage planning program 200 determines the input criteria allows a single selection and/or entry. Test coverage planning program 200 calculates the total number of tests associated with testing the potential input criteria for a single selection and/or entry (e.g., text field, numeric field, drop-down box, radio button, date picker, slider, drag and drop, etc.). For example, system under test 122 includes a text input field. Test coverage planning program 200 evaluates the text input field and determines in order to sufficiently test the text input field (e.g., test for logic errors), the input criteria includes: a valid entry, a blank entry, an entry exceeding a maximum character length, and an invalid input (e.g., malicious code, unanticipated entry, etc.). Test coverage planning program 200 calculates the total number of tests associated with the text input field to be four.

In another embodiment, test coverage planning program 200 determines the input criteria allows for multiple selections and/or entries (e.g., checkbox list, list builder, etc.). Test coverage planning program 200 calculates a total number of possible combinations based on a binomial coefficient associated with the expression of $n!/k!*(n-k)!$, in which "k" and "n" are positive integers. "K" represents the allowed number of selections and "n" represents the total number of possible input selections. For example, the input test field is a checkbox list that includes five input selections (e.g., "n") and allows selection of two input selections (e.g., "k"). Test coverage planning program calculates the number of possible combinations as: $5!/(2!*(5-2)!)$, which equals ten.

Test coverage planning program 200 combines the total number of tests associated with individual instances of an identified test input field in order to determine total feasible test inventory 124. Continuing the previous examples, system under test 122 includes a text input field and a checkbox list. Test coverage planning program 200 calculates the number of tests for the text field to be four and the number of possible combinations for the checkbox list to be ten. Test coverage planning program 200 combines the total number of tests for the text input field with the total number of combination for the checkbox list (10) and determines total feasible test inventory 124 equals 14 tests overall. Test coverage planning program 200 updates total feasible test inventory 124 until test coverage planning program 200 identifies and evaluates all of the individual instances of interactive user inputs within system under test 122.

In step 206, test coverage planning program 200 creates test plan report 126. For the individual instances of interactive user input fields, test coverage planning program 200 records the associated input field screen uniform resource locator (URL), the user input field description to locate and process the input, and the input criteria to test the input field. For example, the interactive user input field is a drop-down box. The drop-down box includes three selections of "yes," "no," and "maybe." Test coverage planning program 200 records the input screen URL associated with the drop-down box, the user input field location, and the list of three alternatives, "yes," "no," and "maybe," within test plan report 126. Test coverage planning program includes total feasible test inventory 124 within test plan report 126 in addition to a description detailing the interactive user input fields and input criteria to be entered to perform testing of system under test 122. Test coverage planning program 200 stores test plan report 126 upon completion for further use (e.g., development of test suite 128).

In step 208, test coverage planning program 200 performs test suite 128 and records results within test log 129. The testing aspect of test coverage planning program 200 initiates in response to decision 202, no branch. Prior to initiating, a user creates test suite 128 based on test plan report 126. For example, a user develops test cases that address the interactive user input fields and input criteria outlined in test plan report 126 in order to address total feasible test inventory 124 (i.e., design test cases to verify the entirety of total feasible test inventory 124). Test coverage planning program 200 runs test suite 128 as an automated and/or interactive set of test cases that validate the individual input criteria (e.g., condition) associated with the individual instances of identified interactive user input. Test coverage planning program 200 records the test and the input criteria within test log 129. Test coverage planning program 200 additionally records a pass or failure associated with the individual tests within test suite 128 within test log 129 (e.g., records total number of passes and fails within test suite 128).

For example, an interactive input field is a date selector for a hotel reservation. Through test plan report 126, test coverage planning program 200 identifies input criteria to be "yesterday," "today," "tomorrow," "next month," and "next year." Test suite 128 includes test cases to verify the input criteria for "yesterday," "today," "tomorrow," "next month," and "next year" (e.g., five separate tests). Test coverage planning program executes test suite 128 and records the pass or failure status for "yesterday" (e.g., pass), "today" (e.g., pass), "tomorrow" (e.g., pass), "next month" (e.g., pass), and "next year" (e.g., fail) separately, along with the interactive input field and the input criteria within test log 129. In the case of a failure, a user may later review test log 129 for specifics regarding the failure associates with "next year" for further analysis and correction within system under test 122.

In step 210, test coverage planning program 200 calculates a system test coverage percentage. In one embodiment, test coverage planning program 200 identifies the number of test cases executed within test log 129. Test coverage planning program 200 divides the number of test cases executed within test log 129 by total feasible test inventory 124 and determines the system test coverage percentage. For example, test log 129 includes 87 executed test cases, and total feasible test inventory 124 identifies 90 possible tests. Test coverage planning program 200 calculates the system test coverage percentage to be 96.6 percent. In another embodiment, test coverage planning program 200 calculates the passing and/or failing system test coverage percentage. For example, within the 87 test cases, 70 test cases pass and 17 test cases fail. Therefore, test coverage planning program 200 calculates a passing system test coverage percentage to be 77.7 percent, and a failing system test coverage percentage to be 18.8 percent.

In step 212, test coverage planning program 200 provides results. Test coverage planning program 200 provides test log 129 and/or the system test coverage percentage. In one embodiment, test coverage planning program 200 displays results through test coverage planning client program 114. In another embodiment, test coverage planning program 200 stores results for later access through test coverage planning client program 114. In some other embodiment, test coverage planning program 200 displays the system test coverage percentage and provides an option to review test log 129. Test coverage planning program 200 completes upon providing the results.

Figure 3:
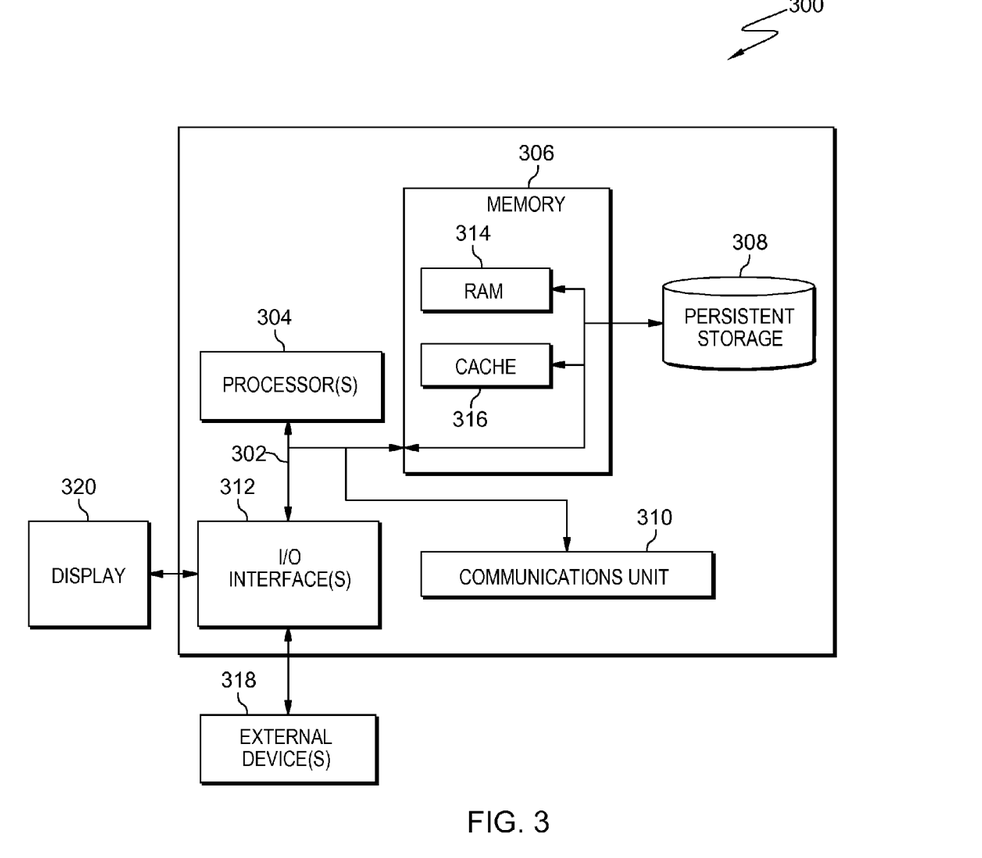
FIG. 3 is a block diagram of components of the server computer executing the test coverage planning program, in accordance with an embodiment of the present invention.

FIG. 3 depicts a block diagram of components of server computer 300 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM) 314. In general, memory 306 can include any suitable volatile or non-volatile computer readable storage media. Cache 316 is a fast memory that enhances the performance of computer processor(s) 304 by holding recently accessed data, and data near accessed data, from memory 306.

User interface 112, test coverage planning client program 114, system under test 122, total feasible test inventory 124, test plan report 126, test suite 128, test log 129, and test coverage planning program 200 may be stored in persistent storage 308 and in memory 306 for execution and/or access by one or more of the respective computer processor(s) 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. User interface 112, test coverage planning client program 114, system under test 122, total feasible test inventory 124, test plan report 126, test suite 128, test log 129, and test coverage planning program 200 may be downloaded to persistent storage 308 through communications unit 310.

I/O interface(s) 312 allows for input and output of data with other devices that may be connected to server computer 300. For example, I/O interface(s) 312 may provide a connection to external device(s) 318, such as a keyboard, a keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., user interface 112, test coverage planning client program 114, system under test 122, total feasible test inventory 124, test plan report 126, test suite 128, test log 129, and test coverage planning program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for creating a test plan, the method comprising:

identifying, by one or more computer processors, one or more interactive inputs associated with a system under test;

determining, by one or more computer processors, a type of input field associated with the one or more identified interactive inputs, wherein the type of input field includes a single type of input field selected from a group of types of input fields that includes a single type of input field wherein the single type of input field includes at least an input criteria for a valid entry, a blank entry, a maximum entry, and an invalid input, and a multiple type of input field, wherein the multiple type of input field includes a number n that represents a total number of possible input selections and a number k that represents an allowed number of selections;

calculating, by one or more computer processors, a number of tests based on the determined type of input field associated with the one or more identified interactive inputs;

calculating, by one or more computer processors, a test inventory based on the calculated number of tests based on the determined type of input field associated with the one or more identified interactive inputs;

creating, by one or more computer processors, a test plan that includes the identified one or more interactive inputs associated with the system under test, the calculated number of tests based on the determined type of input field associated with the one or more identified interactive inputs, and the calculated test inventory, wherein the test plan includes an input field screen uniform resource locator and input criteria for the one or more interactive inputs; and executing, by one or more computer processors, a test suite associated with the created test plan on the system under test.

2. The method of claim 1, wherein identifying the one or more interactive inputs associated with the system under test further comprises:

identifying, by one or more computer processors, an input field screen uniform resource locator associated with the identified one or more interactive inputs;

identifying, by one or more computer processors, an input field description to locate and process an input associated with the identified one or more interactive inputs; and identifying, by one or more computer processors, input criteria associated with the identified one or more interactive inputs.

3. The method of claim 1, wherein calculating the number of tests based on the type of input field further comprises:

determining, by one or more computer processors, that the type of input field includes the multiple selection; and calculating, by one or more computer processors, a binomial coefficient based on the multiple selection.

4. The method of claim 1, further comprising:
recording, by one or more computer processors, results of the executed test suite, wherein the results include at least a total number of tests executed; and
calculating, by one or more computer processors, system test coverage based on the recorded results and a calculated test inventory.

5. The method of claim 1, wherein the system under test is a black box system, in which an internal structure, design, and implementation of the system under test is not known by a tester.

6. The method of claim 1, wherein identifying one or more interactive inputs associated with the system under test further comprises:
analyzing, by one or more computer processors, an active instance of the system under test.

7. A computer program product for creating a test plan, the computer program product comprising:
one or more computer readable storage media and program instructions stored on the one or more computer readable storage media, the program instructions comprising:
program instructions to identify one or more interactive inputs associated with a system under test;
program instructions to determine a type of input field associated with the one or more identified interactive inputs, wherein the type of input field includes a single type of input field selected from a group of types of input fields that includes a single type of input field wherein the single type of input field includes at least an input criteria for a valid entry, a blank entry, a maximum entry, and an invalid input, and a multiple type of input field, wherein the multiple type of input field includes a number n that represents a total number of possible input selections and a number k that represents an allowed number of selections;
program instructions to calculate a number of tests based on the determined type of input field associated with the one or more identified interactive inputs;
program instructions to calculate a test inventory based on the calculated number of tests based on the determined type of input field associated with the one or more identified interactive inputs;
program instructions to create a test plan that includes the identified one or more interactive inputs associated with the system under test, the calculated number of tests based on the determined type of input field associated with the one or more identified interactive inputs, and the calculated test inventory, wherein the test plan includes an input field screen uniform resource locator and input criteria for the one or more interactive inputs; and
program instructions to execute a test suite associated with the created test plan on the system under test.

8. The computer program product of claim 7, wherein to identify the one or more interactive inputs associated with the system under test further comprises one or more of the following program instructions, stored on the one or more computer readable storage media, to:
identify an input field screen uniform resource locator associated with the identified one or more interactive inputs;
identify an input field description to locate and process an input associated with the identified one or more interactive inputs; and
identify input criteria associated with the identified one or more interactive inputs.

9. The computer program product of claim 7, wherein to calculate the number of tests based on the type of input field further comprises one or more of the following program instructions, stored on the one or more computer readable storage media, to:
determine that the type of input field includes the multiple selection; and
calculate a binomial coefficient based on the multiple selection.

10. The computer program product of claim 7, further comprising one or more of the following program instructions, stored on the one or more computer readable storage media, to:
record results of the executed test suite, wherein the results include at least a total number of tests executed; and
calculate system test coverage based on the recorded results and a calculated test inventory.

11. The computer program product of claim 7, wherein the system under test is a black box system, in which an internal structure, design, and implementation of the system under test is not known by a tester.

12. The computer program product of claim 7, wherein to identify one or more interactive inputs associated with the system under test further comprises one or more of the following program instructions, stored on the one or more computer readable storage media, to:
analyze an active instance of the system under test.

13. A computer system for creating a test plan, the computer system comprising:
one or more computer processors, one or more computer readable storage media, and program instructions stored on the computer readable storage media for execution by at least one of the one or more processors, the program instructions comprising:
program instructions to identify one or more interactive inputs associated with a system under test;
program instructions to determine a type of input field associated with the one or more identified interactive inputs, wherein the type of input field includes a single type of input field selected from a group of types of input fields that includes a single type of input field wherein the single type of input field includes at least an input criteria for a valid entry, a blank entry, a maximum entry, and an invalid input, and a multiple type of input field, wherein the multiple type of input field includes a number n that represents a total number of possible input selections and a number k that represents an allowed number of selections;
program instructions to calculate a number of tests based on the determined type of input field associated with the one or more identified interactive inputs;
program instructions to calculate a test inventory based on the calculated number of tests based on the determined type of input field associated with the one or more identified interactive inputs;
program instructions to create a test plan that includes the identified one or more interactive inputs associated with the system under test, the calculated number of tests based on the determined type of input field associated with the one or more identified interactive inputs, and the calculated test inventory, wherein the test plan includes an input field screen uniform resource locator and input criteria for the one or more interactive inputs; and
program instructions to execute a test suite associated with the created test plan on the system under test.

14. The computer system of claim 13, wherein to identify the one or more interactive inputs associated with the system under test further comprises one or more of the following program instructions, stored on the one or more computer readable storage media, to:
- identify an input field screen uniform resource locator associated with the identified one or more interactive inputs;
- identify an input field description to locate and process an input associated with the identified one or more interactive inputs; and
- identify input criteria associated with the identified one or more interactive inputs.

15. The computer system of claim 13, wherein to calculate the number of tests based on the type of input field further comprises one or more of the following program instructions, stored on the one or more computer readable storage media, to:
- determine that the type of input field includes the multiple selection; and
- calculate a binomial coefficient based on the multiple selection.

16. The computer system of claim 13, further comprising one or more of the following program instructions, stored on the one or more computer readable storage media, to:
- record results of the executed test suite, wherein the results include at least a total number of tests executed; and
- calculate system test coverage based on the recorded results and a calculated test inventory.

17. The computer system of claim 13, wherein the system under test is a black box system, in which an internal structure, design, and implementation of the system under test is not known by a tester.

* * * * *